Sept. 15, 1931.  C. Q. PAYNE  1,823,334
ELECTROMAGNETIC CLUTCH
Filed May 31, 1929
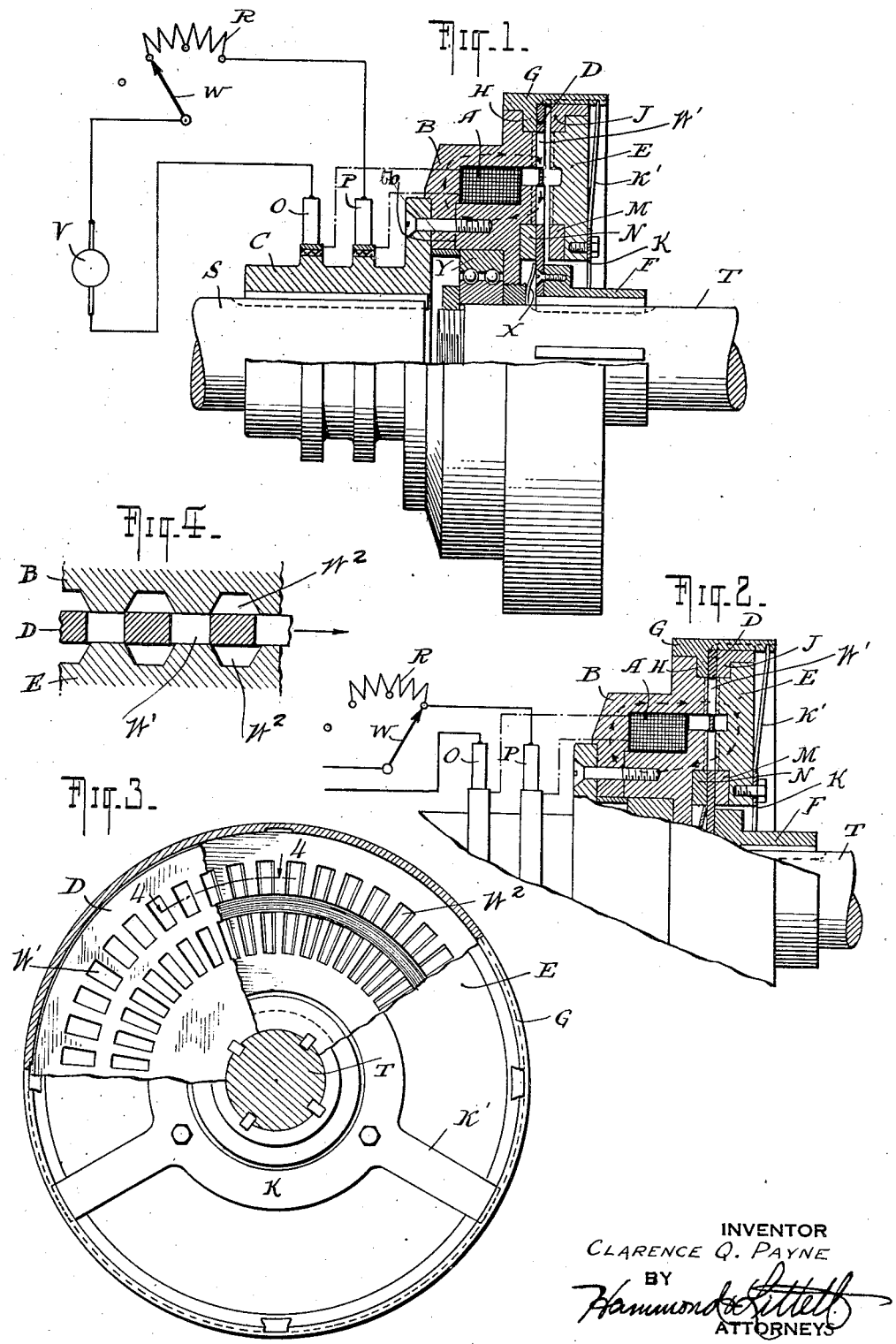
INVENTOR
CLARENCE Q. PAYNE
BY
Hammond & Littell
ATTORNEYS Patented Sept. 15, 1931

1,823,334

UNITED STATES PATENT OFFICE

CLARENCE Q. PAYNE, OF SHIPPAN POINT, STAMFORD, CONNECTICUT, ASSIGNOR OF ONE-FOURTH TO J. GOODWIN HALL, OF NEW YORK, N. Y.

ELECTROMAGNETIC CLUTCH

Application filed May 31, 1929. Serial No. 367,415.

This invention relates to improvements in electromagnetic engaging devices, such as clutches and brakes, whereby a smooth pick-up or gradual engagement of operating parts is obtained.

It especially pertains to that type of electromagnetic clutch or brake in which one of the engaging members comprises at least two parts or elements; so that a partial engagement can be had with another member before both are brought into complete engagement.

The invention comprises both a method and an apparatus adapted to afford a smooth engagement by reducing the magnetic flux of the engaging device in order to create a slip torque, and then increasing the magnetic flux until the attracting force brings all the members of the device into complete engagement with a full driving torque.

An object of the invention is to provide novel means for securing a gradual engagement in connection with magnetized clutch faces which employ flux distortion of the lines of force thereon in the manner explained in my copending application No. 284,171, filed June 9, 1928, and this case is a continuation of said application as to all matter common to the two applications.

In the accompanying drawings

Fig. 1 shows a side view partly in section of a clutch coupling with a resistance coil in series with the field coil of the clutch so as to secure a slip torque by partial engagement of the clutch.

Fig. 2 is a similar view showing the resistance coil in cut-out position and the clutch members in locking engagement.

Fig. 3 shows in end view an arrangement of radial grooves in the polar areas of the electromagnet and disc-plate to increase the flux distortion and sliding resistance of the clutch members; and Fig. 4 is an enlarged sectional view through the pole face, disc-plate and armature to illustrate the edge relation of the grooves and slots which gives the maximum flux distortion and sliding resistance.

The same reference characters identify the same parts throughout.

In practice the tendency of a magnetic clutch to lock suddenly, or to "grab" upon engagement has been one of the serious objections to its extended use. With large clutches having considerable metal in their cores, a decided interval of time is required after electrical connection is made while the flux density builds up, and reaches its maximum. During this interval a certain amount of slipping may take place, especially in picking up a load having a hard starting torque. This eases the engagement and prevents violent shocks and jars being thrown upon the transmitting mechanism. Hence large magnetic clutches are not very troublesome in action.

In most cases, however, especially with clutches of moderate size and weight, where the pull out or starting torque is considerably in excess of the regular operating or driving torque, it has heretofore been difficult to control the slippage and to avoid the tendency of the magnetic clutch to "grab" upon engagement, with resulting shocks and jerks to the parts and inconvenience in operation. My present invention overcomes this objection and secures a smooth engagement and gradual pick-up of the load.

Figs. 1 and 2 illustrate a shaft coupling in partial and in complete engagement respectively according to my invention. Here A represents the energizing field-coil of the bipolar electromagnet B. The latter may be constructed in two parts united at $b$ as shown, for convenience in assembling the coil and to enable the pole face areas to be expanded and provided with radial grooves, and with separate pressure surfaces in the manner set forth in my said copending application No. 284,171.

The electromagnet B is mounted upon a suitable hub C, which is keyed to the drive shaft S, and provides a bearing support Y for the end of the driven shaft T. The disc-plate D, of soft iron or steel, is mounted between the electromagnet B and its armature E, and its hub F is slidably keyed to the shaft T and revolves in close proximity to the pole-faces of the electromagnet. A driving sleeve G, which carries a pressure ring H, which is preferably of nonmagnetic metal, is rigidly attached to the outer circumference of the electromagnet B, and receives the pressure ring J, which is rigidly attached to the armature E. The ring J and sleeve G may be keyed together, so that the ring J can slide to some extent axially in the sleeve G, but must rotate with it. The armature E is thus enabled, because it is fixed to the ring J, to move a short distance from the position shown in Fig. 1 to the position shown in Fig. 2 when the full force of the electromagnet is exerted to bring the clutch members into locking engagement. Whether engaged or not, the parts B and E rotate together. A spring plate K with radial arms K' is attached to the outer face of the armature E and the outer ends of the radial arms K' are inserted in a circular slot in the driving sleeve G. By giving these arms a sufficient set or inclination when the ring K is attached to the armature E, any desired degree of pressure can be utilized to maintain the armature E a short distance out of engagement with the disc-plate D and electromagnet B, as shown in Fig. 1.

When the clutch is disengaged the disc-plate D is allowed to float freely in the space between the electromagnet B and the armature E, and to assist its release from the former upon disengagement a light spring washer X may be employed in the position shown.

In accomplishing the purpose of my present invention I find it desirable in operating the clutch, to introduce a resistance coil, or similar rheostat control R in series with the energizing field-coil A of the electromagnet and the generator V or other source of electrical energy.

In starting to engage the clutch the switch arm W is first brought to the position shown in Fig. 1. The resistance coil R is then in series with the field-coil A, and the resistance of R added to that of the coil A, then reduces the magnetomotive force of the electromagnet. The resulting magnetic flux thus developed at the pole faces is only sufficient to attract and bring the disc-plate D into contact with the pole faces of the electromagnet B.

The armature E in this position is kept out of engagement with the disc-plate D by the tension of the spring plate K. The path of the magnetic flux is thus short-circuited through the disc-plate as shown by the broken line and arrows in Fig. 1. Only two of the four contact faces are thus engaged and the clutch then applies a slip-torque to the load to be picked up by the driven shaft T. The parts B and E turn together, but the disc D slips between them. The amount of the torque exerted while the clutch is slipping will depend upon the reduction of the magnetic flux caused by the resistance coil R. It may amount to 15% or 25% of the driving torque, or still more, depending upon the nature of the load to be picked up by the clutch. After a slight interval of time while the clutch is slipping, in order to secure a complete engagement, the switch W is moved to the position shown in Fig. 2. The resistance coil or other resistance R is then cut-out by the switch W, and the full magnetomotive force of the electromagnet increases the flux density at the pole faces of the electromagnet sufficiently to overcome the spring tension of arms K' and draws armature E into engagement with the disc-plate D. The path of the magnetic circuit shown by the broken line and arrow heads in Fig. 2, then includes the armature E as well as the disc-plate D, and the clutch is thus brought into complete locking engagement. In this position the full driving torque is developed by the contact of four magnetized surfaces and all slipping is overcome.

In order to obtain the maximum efficiency from the clutch as well as a smooth engagement, I prefer to embody in it also the improvements set forth in my said application No. 284,171. These include the use of pressure bearing surfaces such as are shown at H and J and M and N in Fig. 1; which are separate from the annular torque producing areas of the pole-faces, disc-plate and armature. These latter torque areas are disposed upon the same magnetic flux circuit, and are provided with radial grooves $W^2$ forming separated relatively high reluctance paths, whose edges occupy radial positions as shown in Fig. 3. The grooves $W^2$ are in the parts B and E, between the surfaces H and M and J and N; and the disk D has corresponding radial slots W' forming separated relatively high reluctance paths. Relative movement of the surfaces in contact is thus strongly resisted by the flux distortion of the magnetic circuit when the edges of the radial grooves and slots are brought into the relative positions shown in section on a larger scale in Fig. 4. The function is as set forth in my aforesaid application. In this way a clutch can be constructed having a very powerful initial torque in relation to its weight, and at the same time the torque can be so regulated and controlled by partial engagement and slippage that a very smooth pickup of the load can be obtained.

While I have described certain means whereby a slip-torque may be obtained, such as a resistance coil in series with the field-coil of the electromagnet, I do not desire to limit my invention to any specific means for this purpose. I am aware, for example, that it would also be possible to employ a switch with a make-and-break device, in place of the resistance coil, whereby upon closing the switch a temporary reduction in the magneto-motive force of the electromagnet can be obtained which would create a slip-torque and thus permit also gradual engagement of the clutch. Other means will also suggest themselves to those skilled in the art.

Having thus described my invention what I claim as new and desire to secure by Letters Patent is:—

1. An electromagnetic clutch comprising, an electro-magnet, an armature, a magnetizable disc-plate between the electromagnet and armature and rotatable relatively to the electromagnet, means for varying the flux density at the pole faces of the electromagnet, and yieldable means tending to hold the armature with its clutch face at a greater distance from the clutch face of the electromagnet than the thickness of the disc-plate, said yieldable means being so regulated that when the flux density at the pole faces of the electro-magnet is brought to a certain amount the disc-plate will be caused to have forceful contact with the electromagnet to create a slip-torque between the disc-plate and electromagnet and the armature will not be attracted into contact with the disc-plate, and when the flux density at the pole faces of the electromagnet is subsequently increased to a certain greater amount the armature will be attracted into contact with the disc-plate to lock the disc-plate against rotation relatively to the electromagnet.

2. The electromagnetic clutch according to claim 1 wherein the electromagnet, armature and disc-plate are each provided with an annularly arranged series of separated relatively high reluctance paths.

3. The electromagnetic clutch according to claim 1 wherein the electromagnet and armature are each provided with an annularly arranged series of separated grooves, and the disc-plate is provided with an annularly arranged series of separated slots.

4. The electromagnetic clutch according to claim 1 wherein the electromagnet is bipolar, and the electromagnet, armature and disc-plate are each provided with two annularly arranged series of separated relatively high reluctance paths.

5. The electromagnetic clutch according to claim 1 wherein the electromagnet and armature are splined together.

6. An electromagnetic clutch comprising, an electromagnet, an armature, a magnetizable disc-plate between the electromagnet and armature and rotatable relatively to the electromagnet, means for varying the flux density at the pole faces of the electromagnet, spring means for moving the disc-plate out of contact with the electromagnet, and other spring means tending to hold the armature with its clutch face at a greater distance from the clutch face of the electromagnet than the thickness of the disc-plate, both said spring means being so regulated that when the flux density at the pole faces of the electromagnet is brought to a certain amount the disc-plate will be caused to have forceful contact with the electromagnet to create a slip-torque between the disc-plate and electromagnet and the armature will not be attracted into contact with the disc-plate, and when the flux density at the pole faces of the electromagnet is subsequently increased to a certain greater amount the armature will be attracted into contact with the disc-plate to lock the disc-plate against rotation relatively to the electromagnet.

7. The method of clutching a driving and a driven shaft together where one of the shafts has an electromagnet and the other shaft has a magnetizable disc-plate and an armature in co-operative relation to the electromagnet and disc-plate, comprising, bringing the flux density at the pole faces of the electromagnet to a certain amount to cause the disc-plate to have forceful contact with the electromagnet to create a slip-torque between the electromagnet and the disc-plate, and at the same time restraining the armature from moving into contact with the disc-plate, and subsequently bringing the flux density at the pole faces of the electromagnet to a certain greater amount to cause the armature to move into contact with the disc-plate to lock the disc-plate against rotation relatively to the electromagnet.

In testimony whereof I have affixed my signature to this specification.

CLARENCE Q. PAYNE.